US010839825B2

(12) United States Patent
Edwards et al.

(10) Patent No.: US 10,839,825 B2
(45) Date of Patent: Nov. 17, 2020

(54) SYSTEM AND METHOD FOR ANIMATED LIP SYNCHRONIZATION

(71) Applicant: THE GOVERNING COUNCIL OF THE UNIVERSITY OF TORONTO, Toronto (CA)

(72) Inventors: Pif Edwards, Toronto (CA); Chris Landreth, Toronto (CA); Eugene Fiume, Toronto (CA); Karan Singh, Toronto (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 70 days.

(21) Appl. No.: 15/448,982

(22) Filed: Mar. 3, 2017

(65) Prior Publication Data

US 2018/0253881 A1 Sep. 6, 2018

(51) Int. Cl.

| | |
|---|---|
| ***G06T 13/00*** | (2011.01) |
| ***G10L 21/10*** | (2013.01) |
| *G10L 25/90* | (2013.01) |
| *G10L 15/02* | (2006.01) |

(52) U.S. Cl.

CPC .............. *G10L 21/10* (2013.01); *G10L 25/90* (2013.01); *G10L 2015/025* (2013.01); *G10L 2021/105* (2013.01)

(58) Field of Classification Search

None

See application file for complete search history.

(56) References Cited

U.S. PATENT DOCUMENTS

| | | | | |
|---|---|---|---|---|
| 3,916,562 A * | 11/1975 | Burkhart | A63H 3/06 | 446/143 |
| 5,286,205 A * | 2/1994 | Inouye | G09B 19/06 | 434/157 |
| 5,613,056 A * | 3/1997 | Gasper | G06T 13/205 | 345/473 |
| 5,878,396 A * | 3/1999 | Henton | G10L 15/24 | 375/E7.083 |
| 5,995,119 A * | 11/1999 | Cosatto | G06T 13/40 | 345/473 |
| 6,130,679 A * | 10/2000 | Chen | G06T 13/00 | 345/473 |
| 6,181,351 B1 * | 1/2001 | Merrill | G10L 21/06 | 345/473 |
| 6,504,546 B1 * | 1/2003 | Cosatto | G06T 13/40 | 345/473 |

(Continued)

OTHER PUBLICATIONS

Ostermann, Animation of Synthetic Faces in MPEG-4, 1998, IEEE Computer Animation, pp. 49-55.*

(Continued)

*Primary Examiner* — Anh-Tuan V Nguyen

(74) *Attorney, Agent, or Firm* — Bhole IP Law; Anil Bhole; Marc Lampert

(57) ABSTRACT

A system and method for animated lip synchronization. The method includes: capturing speech input; parsing the speech input into phenomes; aligning the phonemes to the corresponding portions of the speech input; mapping the phonemes to visemes; synchronizing the visemes into viseme action units, the viseme action units comprising jaw and lip contributions for each of the phonemes; and outputting the viseme action units.

18 Claims, 16 Drawing Sheets

(56) References Cited

U.S. PATENT DOCUMENTS

| | | | | |
|---|---|---|---|---|
| 6,539,354 | B1 * | 3/2003 | Sutton | G10L 21/06 345/423 |
| 6,665,643 | B1 * | 12/2003 | Lande | G06T 9/001 345/474 |
| 6,735,566 | B1 * | 5/2004 | Brand | G06K 9/6297 345/473 |
| 6,839,672 | B1 * | 1/2005 | Beutnagel | G10L 21/06 704/260 |
| 7,827,034 | B1 * | 11/2010 | Munns | G10L 13/00 704/275 |
| 8,614,714 | B1 * | 12/2013 | Koperwas | G06T 13/20 345/473 |
| 9,094,576 | B1 * | 7/2015 | Karakotsios | H04N 7/157 |
| 10,217,261 | B2 * | 2/2019 | Li | G06T 13/40 |
| 2005/0207674 | A1 * | 9/2005 | Fright | G06K 9/00201 382/294 |
| 2006/0009978 | A1 * | 1/2006 | Ma | 704/266 |
| 2006/0012601 | A1 * | 1/2006 | Francini | G06T 13/205 345/473 |
| 2006/0221084 | A1 * | 10/2006 | Yeung | G06T 13/205 345/474 |
| 2007/0009180 | A1 * | 1/2007 | Huang | G06T 17/20 382/276 |
| 2008/0221904 | A1 * | 9/2008 | Cosatto | G10L 13/00 704/276 |
| 2010/0057455 | A1 * | 3/2010 | Kim | 704/235 |
| 2010/0085363 | A1 * | 4/2010 | Smith | G06T 13/40 345/473 |
| 2011/0099014 | A1 * | 4/2011 | Zopf | G10L 19/16 704/262 |
| 2012/0026174 | A1 * | 2/2012 | McKeon | G06T 13/205 345/473 |
| 2013/0141643 | A1 * | 6/2013 | Carson | H04N 21/4307 348/515 |
| 2014/0035929 | A1 * | 2/2014 | Matthews | G06T 13/40 345/473 |
| 2017/0040017 | A1 * | 2/2017 | Matthews | G10L 21/10 |
| 2017/0092277 | A1 * | 3/2017 | Sandison | G10L 15/26 |
| 2017/0154457 | A1 * | 6/2017 | Theobald | G06T 13/205 |
| 2017/0213076 | A1 * | 7/2017 | Francisco | G06K 9/00228 |
| 2017/0243387 | A1 * | 8/2017 | Li | G06T 13/40 |
| 2018/0158450 | A1 * | 6/2018 | Tokiwa | G10L 15/25 |

OTHER PUBLICATIONS

King et al., An Anatomically-based 3D Parametric Lip Model to Support Facial Animation and Synchronized Speech, 2000, Department of Computer and Information Sciences of Ohio State University, pp. 1-19.*

Wong et al., Allophonic Variations in Visual Speech Synthesis for Corrective Feedback in CAPT, 2011, IEEE International Conference on Acoustics, Speech and Signal Processing, pp. 5708-5711 (Year: 2011).*

Anderson, Robert et al., (2013), Expressive Visual Text-to-Speech Using Active Appearance Models, (pp. 3382-3389).

Bevacqua, E., & Pelachaud, C., (2004). Expressive Audio-Visual Speech. Computer Animation and Virtual Worlds, 15(3-4), 297-304.

Cassell, J., Pelachaud, C., Badler, N., Steedman, M., Achorn, B., Becket, T., et al. (1994). Animated Conversation: Rule-Based Generation of Facial Expression, Gesture & Spoken Intonation for Multiple Conversational Agents. Presented at the SIGGRAPH '94: Proceedings of the 21st annual conference on Computer graphics and interactive techniques, ACM Request Permissions. http://doi.org/10.1145/192161.192272.

Chandrasekaran, C., Trubanova, A., Stillittano, S., Caplier, A., & Ghazanfar, A. A. (2009). The Natural Statistics of Audiovisual Speech. PLoS Computational Biology, 5(7), 1-18. http://doi.org/10.1371/journal.pcbi.1000436.

Cohen, M. M., & Massaro, D. W. (1993). Modeling Coarticulation in Synthetic Visual Speech. Models and Techniques in Computer Animation, 139-156.

Deng, Z., Neumann, U., Lewis, J. P., Kim, T.-Y., Bulut, M., & Narayanan, S. (2006). Expressive Facial Animation Synthesis by Learning Speech Coarticulation and Expression Spaces. IEEE Transactions on Visualization and Computer Graphics, 12(6), 1523-1534. http://doi.org/10.1109/TVCG.2006.90.

Kent, R. D., & Minifie, F. D. (1977). Coarticulation in Recent Speech Production Models. Journal of Phonetics, 5(2), 115-133.

King, S. A. & Parent, R. E. (2005). Creating Speech-Synchronized Animation. IEEE Transactions on Visualization and Computer Graphics, 11(3), 341-352. http://doi.org/10.1109/TVCG.2005.43.

Lasseter, J. (1987). Principles of Traditional Animation Applied to 3D Computer Animation. SIGGRAPH Computer Graphics, 21(4), 35-44.

Marsella, S., Xu, Y., Lhommet, M., Feng, A. W., Scherer, S., & Shapiro, A. (2013). Virtual Character Performance From Speech (pp. 25-36). Presented at the SCA 2013, Anaheim, California.

Mattheyses, W., & Verhelst, W. (2015). Audiovisual Speech Synthesis: An Overview of the State-of-the-Art. Speech Communication, 66(C), 182-217. http://doi.org/10.1016/j.specom.2014.11.001.

Ohman, S. E. (1967). Numerical model of coarticulation. Journal of the Acoustical Society of America, 41(2), 310-320.

Schwartz, J.-L., & Savariaux, C. (2014). No, There Is No 150 ms Lead of Visual Speech on Auditory Speech, but a Range of Audiovisual Asynchronies Varying from Small Audio Lead to Large Audio Lag. PLoS Computational Biology (PLOSCB) 10(7), 10(7), 1-10. http://doi.org/10.1371/journal.pcbi.1003743.

Sutton, S., Cole, R. A., de Villiers, J., Schalkwyk, J., Vermeulen, P. J. E., Macon, M. W., et al. (1998). Universal Speech Tools: the CSLU Toolkit. Icslp 1998.

Taylor, S. L., Mahler, M., Theobald, B.-J., & Matthews, I. (2012). Dynamic Units of Visual Speech. Presented at the SCA '12: Proceedings of the ACM SIGGRAPH/Eurographics Symposium on Computer Animation, Eurographics Association.

Troille, E., Cathiard, M.-A., & Abry, C. (2010). Speech face perception is locked to anticipation in speech production. Speech Communication, 52(6), 513-524. http://doi.org/10.1016/j.specom.2009.12.005.

* cited by examiner

SYSTEM AND METHOD FOR ANIMATED LIP SYNCHRONIZATION

TECHNICAL FIELD

The following relates generally to computer animation and more specifically to a system and method for animated lip synchronization.

BACKGROUND

Facial animation tools in industrial practice have remained remarkably static, typically using animation software like MAYA™ to animate a 3D facial rig, often with a simple interpolation between an array of target blend shapes. More principled rigs are anatomically inspired with skeletally animated jaw and target shapes representing various facial muscle action units (FACS), but the onus of authoring the detail and complexity necessary for human nuance and physical plausibility remain tediously in the hands of the animator.

While professional animators may have the ability, budget and time to bring faces to life with a laborious workflow, the results produced by novices using these tools, or existing procedural or rule-based animation techniques, are generally less flattering. Procedural approaches to automate aspects of facial animation such as lip-synchronization, despite showing promise in the early 1990s, have not kept pace in quality with the complexity of the modern facial models. On the other hand, facial performance capture has achieved such a level of quality that it is a viable alternative to production facial animation. As with all performance capture, however, it has several shortcomings, for example: the animation is limited by the capabilities of the human performer, whether physical, technical or emotional; subsequent refinement is difficult; and partly hidden anatomical structures that play a part in the animation, such as the tongue, have to be animated separately.

A technical problem is thus to produce animator-centric procedural animation tools that are comparable to, or exceed, the quality of performance capture, and that are easy to edit and refine.

SUMMARY

In an aspect, there is provided a method for animated lip synchronization executed on a processing unit, the method comprising: mapping phonemes to visemes; synchronizing the visemes into viseme action units, the viseme action units comprising jaw and lip contributions for each of the phonemes; and outputting the viseme action units.

In a particular case, the method further comprising capturing speech input; parsing the speech input into the phonemes; and aligning the phonemes to the corresponding portions of the speech input.

In a further case, aligning the phonemes comprises one or more of phoneme parsing and forced alignment.

In another case, two or more viseme action units are co-articulated such that the respective two or more visemes are approximately concurrent.

In yet another case, the jaw contributions and the lip contributions are respectively synchronized to independent visemes, and wherein the viseme action units are a linear combination of the independent visemes.

In yet another case, the jaw contributions and the lip contributions are each respectively synchronized to activations of one or more facial muscles in a biomechanical muscle model such that the viseme action units represent a dynamic simulation of the biomechanical muscle model.

In yet another case, mapping the phonemes to visemes comprises at least one of mapping a start time of at least one of the visemes to be prior to an end time of a previous respective viseme and mapping an end time of at least one of the visemes to be after a start time of a subsequent respective viseme.

In yet another case, a start time of at least one of the visemes is at least 120 ms before the respective phoneme is heard, and an end time of at least one of the visemes is at least 120 ms after the respective phoneme is heard.

In yet another case, a start time of at least one of the visemes is at least 150 ms before the respective phoneme is heard, and an end time of at least one of the visemes is at least 150 ms after the respective phoneme is heard.

In yet another case, viseme decay of at least one of the visemes begins between seventy-percent and eighty-percent of the completion of the respective phoneme.

In yet another case, an amplitude of each viseme is determined by one or more of lexical stress and word prominence.

In yet another case, the viseme action units further comprise tongue contributions for each of the phonemes.

In yet another case, the viseme action unit for a neutral pose comprises a viseme mapped to a bilabial phoneme.

In yet another case, the method further comprising outputting a phonetic animation curve based on the change of viseme action units over time.

In another aspect, there is provided a system for animated lip synchronization, the system having one or more processors and a data storage device, the one or more processors in communication with the data storage device, the one or more processors configured to execute: a correspondence module for mapping phonemes to visemes; a synchronization module for synchronizing the visemes into viseme action units, the viseme action units comprising jaw and lip contributions for each of the phonemes; and an output module for outputting the viseme action units to an output device.

In a particular case, the system further comprising an input module for capturing speech input received from an input device, the input module parsing the speech input into the phenomes; and an alignment module for aligning the phonemes to the corresponding portions of the speech input.

In another case, the system further comprising a speech analyzer module for analyzing one or more of pitch and intensity of the speech input.

In yet another case, the alignment module aligns the phonemes by at least one of phoneme parsing and forced alignment.

In yet another case, the output module further outputs a phonetic animation curve based on the change of viseme action units over time.

In another aspect, there is provided a facial model for animation on a computing device, the computing device having one or more processors, the facial model comprising: a neutral face position; an overlay of skeletal jaw deformation, lip deformation and tongue deformation; and a displacement of the skeletal jaw deformation, the lip deformation and the tongue deformation by a linear blend of weighted blend-shape action units.

These and other aspects are contemplated and described herein. It will be appreciated that the foregoing summary sets out representative aspects of systems and methods for animated lip synchronization to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1:
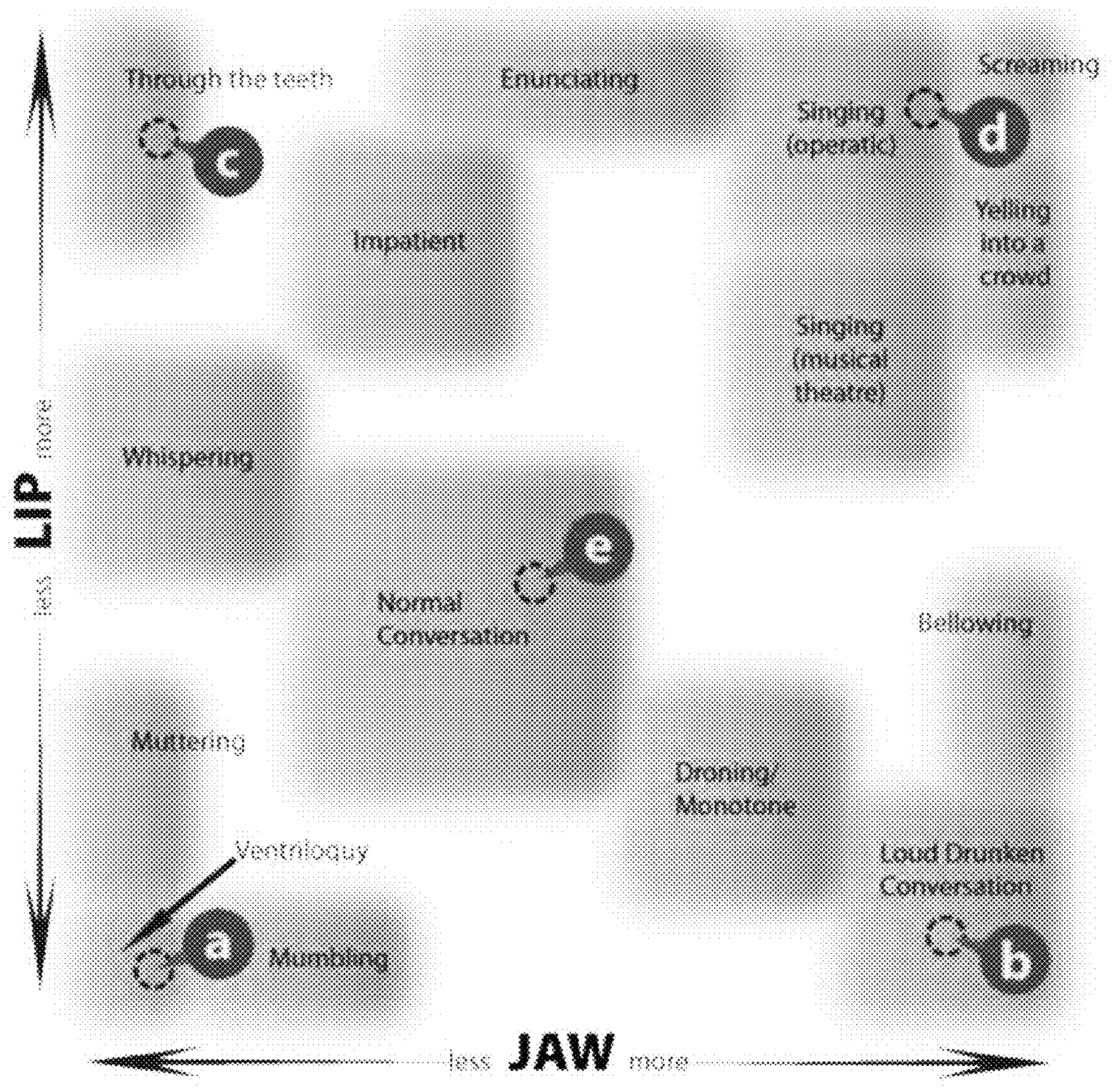
FIG. 1 is an exemplary graph mapping some common phonemes to a two-dimensional viseme field with jaw movement increasing along the horizontal axis and lip movement increasing along the vertical axis.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: “or” as used throughout is inclusive, as though written “and/or”; singular articles and pronouns as used throughout include their plural forms, and vice versa; similarly, gendered pronouns include their counterpart pronouns so that pronouns should not be understood as limiting anything described herein to use, implementation, performance, etc. by a single gender; “exemplary” should be understood as “illustrative” or “exemplifying” and not necessarily as “preferred” over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

As used herein, the term “viseme” means ‘visible phoneme’ and refers to the shape of the mouth at approximately the apex of a given phoneme. Viseme is understood to mean a facial image that can be used to describe a particular sound. Whereby, a viseme is the visual equivalent of a phoneme or unit of sound in spoken language.

Further, for the purposes of the following disclosure, the relevant phonemic notation is as follows:

| Symbol | Example |
|---|---|
| % | (silence) |
| AE | bat |
| EY | bait |
| AO | caught |
| AX | about |
| IY | beet |
| EH | bet |
| IH | bit |
| AY | bite |
| IX | roses |
| AA | father |
| UW | boot |
| UH | book |
| UX | bud |
| OW | boat |
| AW | bout |
| OY | boy |
| b | bin |
| C | chin |

-continued

| Symbol | Example |
|---|---|
| d | din |
| D | them |
| @ | (breath intake) |
| f | fin |
| g | gain |
| h | hat |
| J | jump |
| k | kin |
| l | limb |
| m | mat |
| n | nap |
| N | tang |
| p | pin |
| r | ran |
| s | sin |
| S | shin |
| t | tin |
| T | thin |
| v | van |
| w | wet |
| y | yet |
| z | zoo |
| Z | measure |

The following relates generally to computer animation and more specifically to a system and method for animated lip synchronization.

Generally, prior techniques for computer animation of mouth poses rely on dividing up speech segment into each phoneme, then producing an animation for each one of the phonemes; for example, creating visemes for each phoneme, and then applying the visemes to a given speech segment. Typically, such techniques would unnaturally transition from a neutral face straight to the viseme animation. Additionally, such techniques typically assume each phoneme has a unique physical animation represented by a unique viseme.

However, prior techniques that follow this approach are not accurately representative of realistic visual representations of speech. As an example, a ventriloquist can produce many words and phonemes with very minimal facial movement, and thus, with atypical visemes. As such, these conventional approaches are not able to automatically generate expressive lip-synchronized facial animation that is not only based on certain unique phonetic shapes, but also based on other visual characteristics of a person's face during speech. As an example of the substantial advantage of the method and system described herein, animation of speech can be advantageously based on the visual characteristics of a person's jaw and lip characteristics during speech. The system described herein is able to generate different animated visemes for a certain phonetic shape based on jaw and lip parameters; for example, due to how an audio signal changes the way a viseme looks.

In embodiments of the system and method described herein, technical approaches are provided to solve the technological computer problem of realistically representing and synchronizing computer-based facial animation to sound and speech. In embodiments herein, technical solutions are provided such that given an input audio soundtrack, and in some cases a speech transcript, there is automatic generation of expressive lip-synchronized facial animation that is amenable to further artistic refinement. The systems and methods herein draw from psycholinguistics to capture speech using two visually distinct anatomical actions: those of the jaw and lip. In embodiments herein, there is provided construction of a transferable template 3D facial rig.

Figure 2:
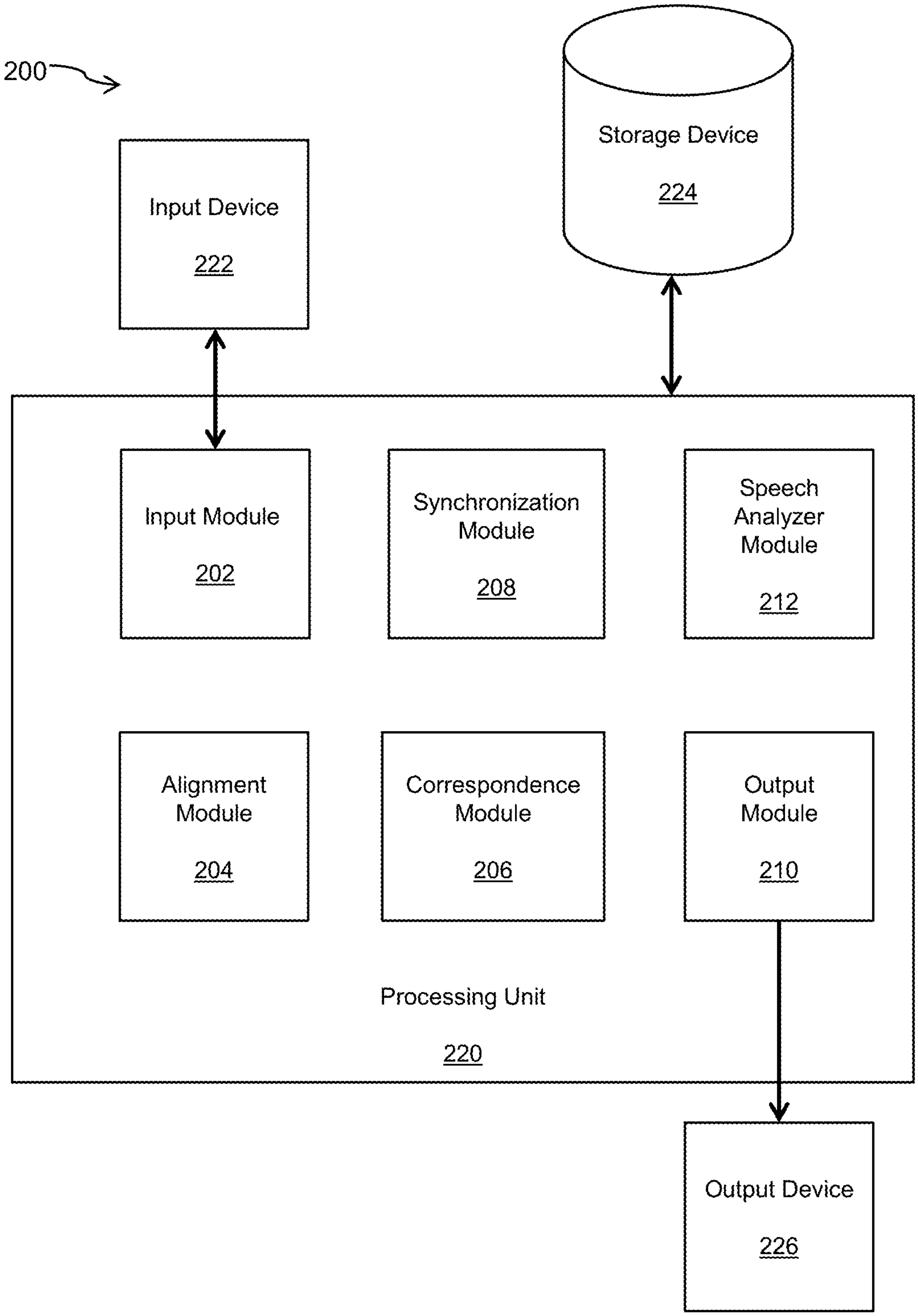
FIG. 2 is a diagram of a system for animated lip synchronization, according to an embodiment.

Turning to FIG. 2, a diagram of a system for animated lip synchronization 200 is shown. The system 200 includes a processing unit 220, a storage device 224, an input device 222, and an output device 226. The processing unit 220 includes various interconnected elements and modules, including a correspondence module 206, a synchronization module 208, and an output module 210. In some cases, the processing unit 220 can also include an input module 202 and an alignment module 204. The processing unit 220 may be communicatively linked to the storage device 224 which may be loaded with data, for example, input data, correspondence data, synchronization data, or alignment data. In further embodiments, the above modules may be executed on two or more processors, may be executed on the input device 222 or output device 226, or may be combined in various combinations.

In the context of speech synchronization, an example of a substantial technical problem is that given an input audio soundtrack and speech transcript, there is a need to generate a realistic, expressive animation of a face with lip and jaw, and in some cases tongue, movements that synchronize with an audio soundtrack. In some cases, beyond producing realistic output, such a system should integrate with the traditional animation pipeline, including the use of motion capture, blend shapes and key-framing. In further cases, such a system should allow animator editing of the output. While preserving the ability of animators to tune final results, other non-artistic adjustments may be necessary in speech synchronization to deal with, for example, prosody, mispronunciation of text, and speech affectations such as slurring and accents. In yet further cases, such a system should respond to editing of the speech transcript to account for speech anomalies. In yet further cases, such a system should be able to produce realistic facial animation on a variety of face rigs.

For the task of speech synchronization, the system 200 can aggregate its attendant facial motions into two independent categories: functions related to jaw motion, and functions related to lip motion (see FIG. 1). Applicant recognized the substantial advantage of employing these two dimensions, which are the basis of a model executed by the system 200 as described herein (referred to herein as the "JALI model"), to capture a wide range of the speech phenomenology and permit interactive exploration of an expressive face space.

Figure 3:
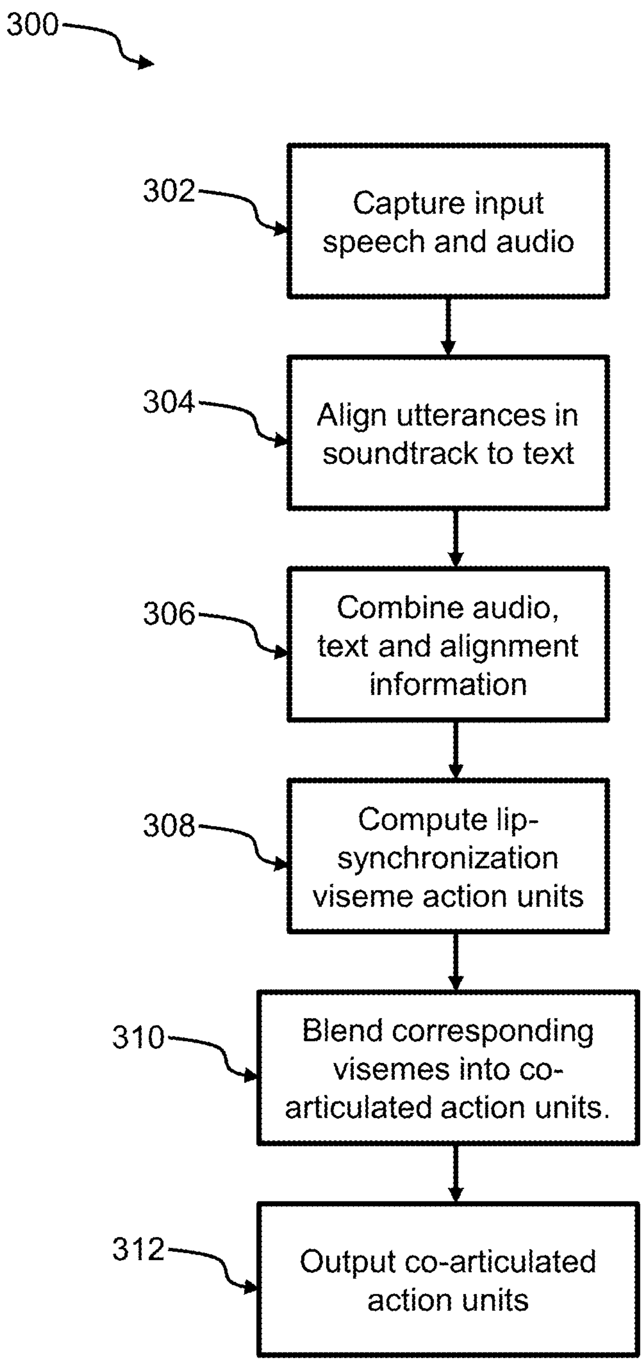
FIG. 3 is a flowchart of a method for animated lip synchronization, according to an embodiment.

Turning to FIG. 3, a flowchart for a method for animated lip synchronization 300 is shown. In some cases, at block 302, a segment of speech is captured as input by the input module 202 from the input device 222. In certain cases, the captured speech can be an audio soundtrack, a speech transcript, or an audio track with a corresponding speech transcript.

In some cases, at block 304, the alignment module 204 employs forced alignment to align utterances in the soundtrack to the text, giving an output time series containing a sequence of phonemes.

At block 306, the correspondence module 206 combines audio, text and alignment information to produce text-to-phoneme and phoneme-to-audio correspondences.

At block 308, the synchronization module 208 computes lip-synchronization viseme action units. The lip-synchronization viseme action units are computed by extracting jaw and lip motions for individual phonemes. However, humans do not generally articulate each phoneme separately. Thus, at block 310, the synchronization module 208 blends the corresponding visemes into co-articulated action units. As such, the synchronization module 208 is advantageously able to more accurately track real human speech.

At block 312, the output module 210 outputs the synchronized co-articulated action units to the output device 226.

In some cases, the speech input can include at least one of a speech audio and a speech transcript.

In some cases, as described in greater detail herein, two or more viseme action units can be co-articulated such that the respective two or more visemes are approximately concurrent.

In some cases, jaw behavior and lip behavior can be captured as independent viseme shapes. As such, jaw and lip intensity can be used to modulate the blend-shape weight of the respective viseme shape. In this case, the viseme action units are a linear combination of the modulated viseme shape. In other words, the jaw contributions and the lip contributions can be respectively synchronized to independent visemes, and the viseme action units can be a linear combination of the independent visemes.

In some cases, the jaw contributions and the lip contributions can each respectively be synchronized to activations of one or more facial muscles in a biomechanical muscle model. In this way, the viseme action units represent a dynamic simulation of the biomechanical muscle model.

In some cases, viseme action units can be determined by manually setting jaw and lip values over time by a user via the input device 222. In other cases, the viseme action units can be determined by receiving lip contributions via the input device 22, and having the jaw contributions be determined by determining the modulation of volume of input speech audio. In other cases, the lip contributions and the jaw contributions can be automatically determined by the system 300 from input speech audio and/or input speech transcript.

In some cases, as described in greater detail herein, mapping the phonemes to visemes can include at least one of mapping a start time of at least one of the visemes to be prior to an end time of a previous respective viseme and mapping an end time of at least one of the visemes to be after a start time of a subsequent respective viseme.

In some cases, as described in greater detail herein, a start time of at least one of the visemes is at least 120 ms before the respective phoneme is heard, and an end time of at least one of the visemes is at least 120 ms after the respective phoneme is heard.

In some cases, as described in greater detail herein, a start time of at least one of the visemes is at least 150 ms before the respective phoneme is heard, and an end time of at least one of the visemes is at least 150 ms after the respective phoneme is heard.

In some cases, as described in greater detail herein, viseme decay of at least one of the visemes begins between seventy-percent and eighty-percent of the completion of the respective phoneme.

As follows, Applicant details an exemplary development and validation of the JALI model according to embodiments of the system and method described herein. Applicant then demonstrates how the JALI model can be constructed over a typical FACS-based 3D facial rig and transferred across such rigs. Further, Applicant provides system implementation for an automated lip-synchronization approach, according to an embodiment herein.

Computer facial animation can be broadly classified as procedural, data-driven, or performance-capture. Procedural speech animation segments speech into a string of phonemes, which are then mapped by rules or look-up tables to visemes; typically many-to-one. As an example, / m b p / all map to the viseme MMM in FIG. 4. This is complicated by the human habit of co-articulation. When humans speak, their visemes overlap and crowd each other out in subtle ways that complicate the speech's visual representation. Thus, it is advantageous for a procedural model to have a realistic co-articulation scheme. One such model is a dominance model that uses dominance functions that overlap; giving values indicating how close a given viseme reaches its target shape given its neighbourhood of phonemes. A common weakness of the dominance model is the failure to ensure lip closure of bilabials (/m b p/). There are several variants of the dominance model. For example, rule-based co-articulation models use explicit rules to dictate the co-articulation under explicit circumstances. As an example, diphone co-articulation defines a specific animation curve for every pair of phonemes used in a given language. These are then concatenated to generate speech animation. This approach has also been explored for tri-phone co-articulation.

Procedural animation techniques generally produce compact animation curves amenable to refinement by animators; however, such approaches are not as useful for expressive realism as data-driven and performance-capture approaches. However, neither procedural animation, nor data-driven and performance-capture approaches, explicitly model speech styles; namely the continuum of viseme shapes manifested by intentional variations in speech. Advantageously, such speech styles are modelled by the system and method described herein.

Data-driven methods smoothly stitch pieces of facial animation data from a large corpus, to match an input speech track. Multi-dimensional morphable models, hidden Markov models, and active appearance models (AAM) have been used to capture facial dynamics. For example, AAM-based, Dynamic Visemes uses cluster sets of related visemes, gathered through analysis of the TIMIT corpus. Data-driven methods have also been used to drive a physically-based or statistically-based model. However, the quality of data-driven approaches is often limited by the data available; many statistical models drive the face directly, disadvantageously taking ultimate control away from an animator.

Performance-capture based speech animation transfers acquired motion data from a human performer onto a digital face model. Performance capture approaches generally work based on real-time performance-based facial animation, and while often not specifically focused on speech, are able to create facial animation. One conventional approach uses a pre-captured database to correct performance capture with a deep neural network trained to extract phoneme probabilities from audio input in real time using an appropriate sensor. A substantial disadvantage of performance capture approaches is that it is limited by the captured actor's abilities and is difficult for an animator to refine.

The JALI viseme model, according to an embodiment herein, is driven by the directly observable bioacoustics of sound production using a mixture of diaphragm, jaw, and lip. The majority of variation in visual speech is accounted for by jaw, lip and tongue motion. While trained ventriloquists are able to speak entirely using their diaphragm with little observable facial motion, most people typically speak using a mix of independently controllable jaw and lip facial action. The JALI model simulates visible speech as a linear mix of jaw-tongue (with minimal face muscle) action and face-muscle action values. The absence of any JA (jaw) and LI (lip) action is not a static face but one perceived as poor-ventriloquy or mumbling. The other extreme is hyperarticulated screaming (see, for example, FIG. 1). A substantially advantageous feature of the JALI model, as encompassed in the systems and method described herein, is thus the ability to capture a broad variety of visually expressive speaking styles.

Figure 5:
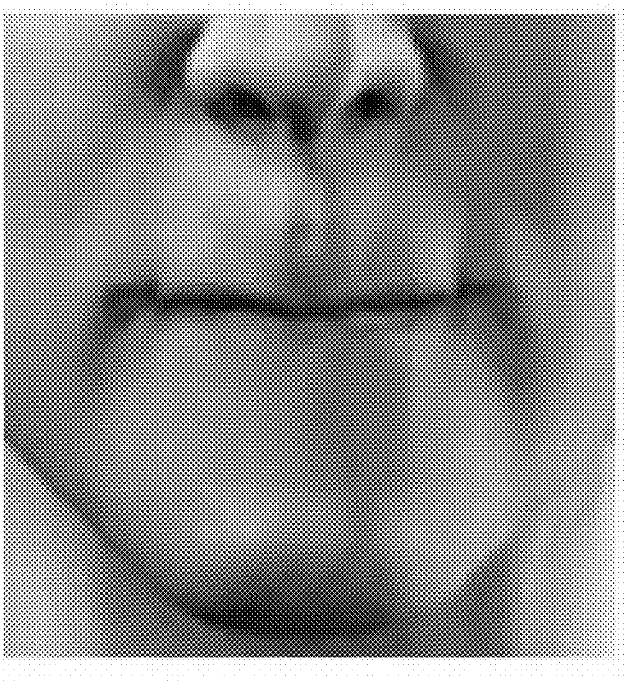
FIG. 5 illustrates an example of phonemes/f v/mapped to a single FFF viseme.

Conventional animation of human speech is based on a mapping from phonemes to visemes, such as the two labiodental phonemes /f v/ mapping to a single FFF viseme, shown in FIG. 5, where the lower lip is pressed against the upper teeth. Typically, animators create linearly superposed blend-shapes to represent these visemes and animate speech by keyframing these blend-shapes over time. This conventional approach overlooks the fact that phonemes in speech can be expressed by a continuum of viseme shapes based on phonetic context and speech style. When humans hyper-articulate (i.e., over-enunciate), they form visemes primarily with lip motion using facial muscles, with little or no jaw movement. Conversely, when humans hypo-articulate (i.e., under-enunciate or speak in a drone), they use primarily jaw/tongue motion with little or no lip action. In normal conversation, humans use varying combinations of lip and jaw/tongue formations of visemes arbitrarily or indiscriminately. As shown in FIG. 1, as an example, each phoneme can be mapped to a 2D viseme field along nearly independent jaw and lip axes, which captures a wide range of expressive speech.

Figure 6:
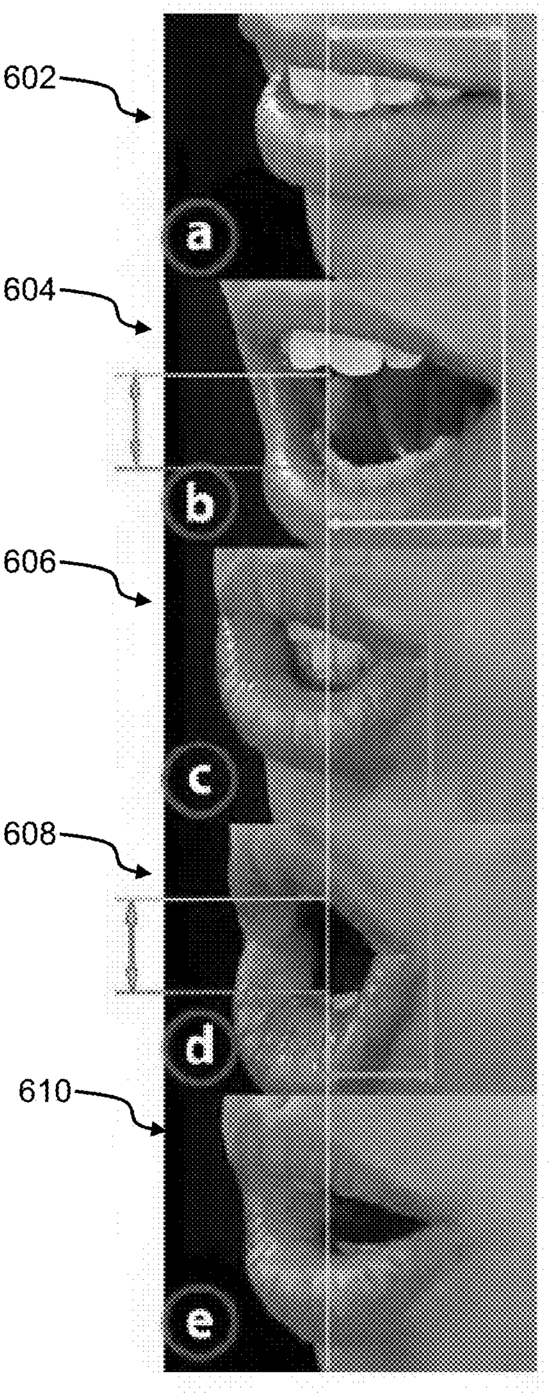
FIG. 6 illustrates an example of visemes corresponding to five arbitrarily-chosen speaking styles.

Visemes corresponding to five arbitrarily-chosen speaking styles for the phoneme /AO/ in 'thOUght' performed by an actor are shown in FIG. 6. In all five articulations /AO/ is pronounced with equal clarity and volume, but with considerable viseme variation. From 602 to 608 (also marked (a) to (e), respectively, on FIG. 1), /AO/ is pronounced: like an amateur ventriloquist with minimal jaw and lip activity 602; with considerable jaw activity but little or no facial muscle activity, as in loud drunken conversation 604; with high face muscle activation but minimal jaw use, as though enunciating 'through her teeth' 606; with substantial activity in both jaw and lip, like singing operatically 608; and with moderate use of both lip and jaw, in normal conversation 610. Note that the lip width is consistent for 602 and 604 (both having minimal lip activation), and for 606 and 608 (maximal lip activation). Also note that jaw opening is consistent for 602 and 606 (both having minimal jaw activation) and for 604 and 608 (maximal jaw activation).

Applicant recognized the substantial advantage of using a JALI viseme field to provide a controllable abstraction over expressive speech animation of the same phonetic content. As described herein, the JALI viseme field setting over time, for a given performance, can be extracted plausibly through analysis of the audio signal. In the systems and methods described herein, a combination of the JALI model with lip-synchronization, described herein, can animate a character's face with considerable realism and accuracy.

Figure 7:
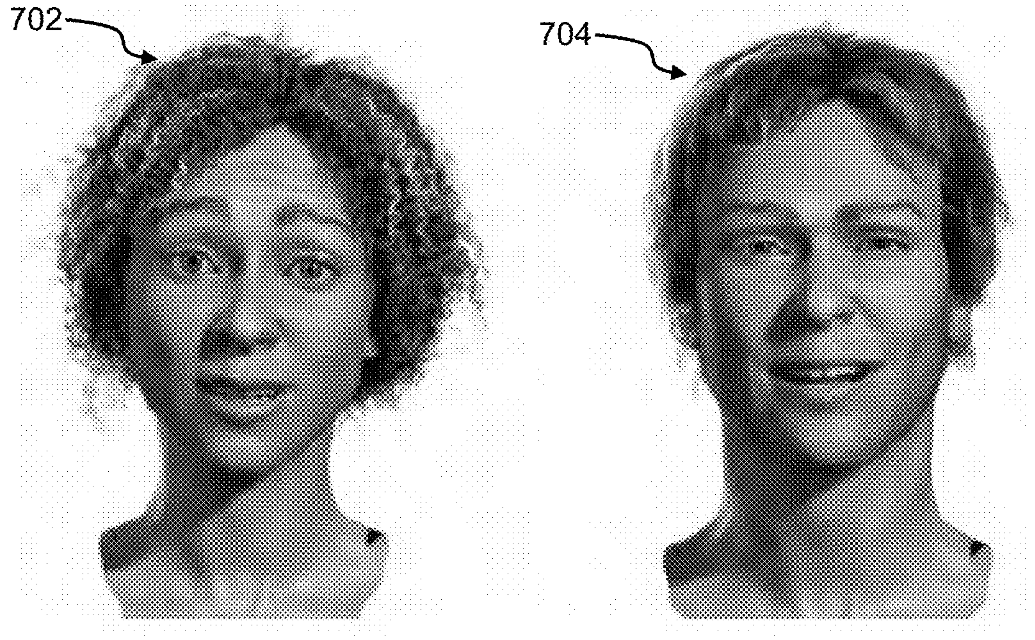
FIG. 7 illustrates two examples of a compatible animatable facial rig.

In an embodiment, as shown in FIG. 7, an animatable facial rig can be constructed that is compatible with the JALI viseme field. The "Valley Girl" rig 702 is a fairly realistic facial model rigged in MAYA™. Her face is controlled through a typical combination of blend-shapes (to animate her facial action units) and skeletal skinning (to animate her jaw and tongue). The rig controls are based on Facial Action Coding System (FACS) but do not exhaustively include all Action Units (AUs), nor is it limited to AUs defined in FACS.

A conventional facial rig often has individual blend-shapes for each viseme; usually with a many-to-one mapping from phonemes to visemes, or many-to-many using dynamic visemes. In contrast, a JALI-rigged character, according to the system and method described herein, may require that such visemes be separated to capture sound production and shaping as mixed contribution of the jaw, tongue and facial muscles that control the lips. As such, the face geometry is a composition of a neutral face nface, overlaid with skeletal jaw and tongue deformation jd; td, displaced by a linear blend of weighted blend-shape action unit displacements au; thus, face=nface+jd+td+au.

To create a viseme within the 2D field defined by JA and LI for any given phoneme p, the geometric face(p) can be set for any point JA,LI in the viseme field of p to be:

$$\mathrm{face}(p;JA;LI)=n\mathrm{face}+JA*(jd(p)+td(p))+LI*au(p)$$

where jd(p), td(p), and au(p) represent an extreme configuration of the jaw, tongue and lip action units, respectively, for the phoneme p. Suppressing both the JA and LI values here would result in a static neutral face, barely obtainable by the most skilled of ventriloquists. Natural speech without JA, LI activation is closer to a mumble or an amateur attempt at ventriloquy.

Figures 8A, 8B, 8C:
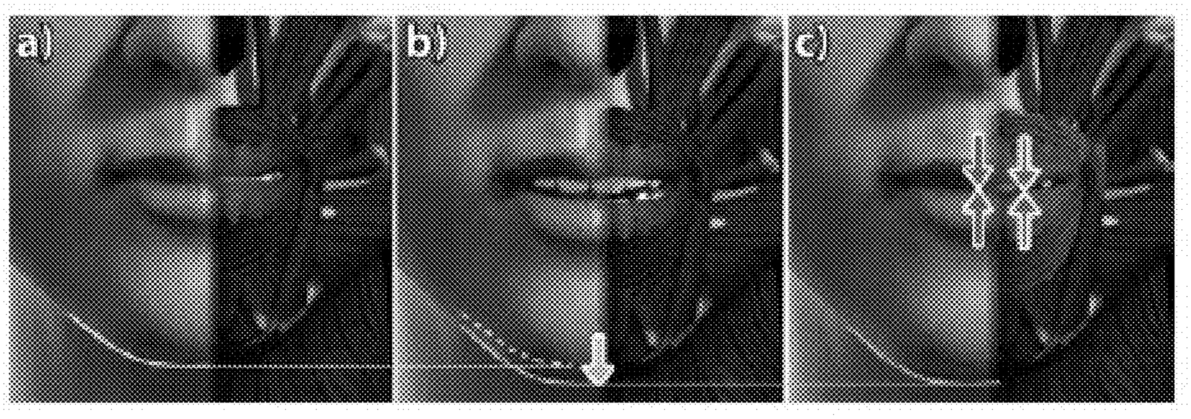
FIG. 8*a* illustrates an example of a neutral face on a conventional rig.
FIG. 8*b* illustrates an example of a neutral face with jaw hanging open from gravity.
FIG. 8*c* illustrates an example of a neutral face with a JALI model.

For an open-jaw neutral pose and 'ventriloquist singularity', a neutral face of the JALI model is configured such that the character's jaw hangs open slightly (for example, see FIG. 8*b*), and the lips are locked with a low intensity use of the "lip-tightening" muscle (orbicularis oris), as if pronouncing a bilabial phoneme such as /m/ (see for example, FIG. 8*c*). This JALI neutral face is more faithful to a realistic relaxed human face than the conventionally used neutral face having the jaw clenched shut and no facial muscles activated (for example, as shown in FIG. 8*a*).

Advantageously, the neutral face according the system and method described herein is better suited to produce 'ventriloquist' visemes (with zero (JA,LI) activation). In some cases, three 'ventriloquist' visemes can be used: the neutral face itself (for the bilabials /b m p/), the neutral face with the orbicularis oris superior muscle relaxed (for the labiodentals /f v/), and the neutral face with both orbicularis oris superior and inferior muscles relaxed, with lips thus slightly parted (for all other phonemes). This 'Ventriloquist Singularity' at the origin of the viseme field (i.e. (JA,LI)=(0,0)), represents the lowest energy viseme state for any given phoneme.

For any given phoneme p, the geometric face for any point (p, JA, LI) is thus defined as:

$$\mathrm{face}(p;JA;LI)=n\mathrm{face}+JA*jd(p)+(vtd(p)+JA*td(p))+(vau(p)+LI*(au(p))$$

where vtd(p) and vau(p) are the small tongue and muscle deformations necessary to pronounce the ventriloquist visemes, respectively.

For animated speech, the JALI model provides a layer of speech abstraction over the phonetic structure. The JALI model can be phonetically controlled by traditional keyframing or automatic procedurally generated animation (as described herein). The JALI viseme field can be independently controlled by the animator over time, or automatically driven by the audio signal (as described herein). In an example, for various speaking styles, a single representative set of procedural animation curves for the face's phonetic performance can be used, and only the (JA,LI) controls are varied from one performance to the next.

Figure 9:
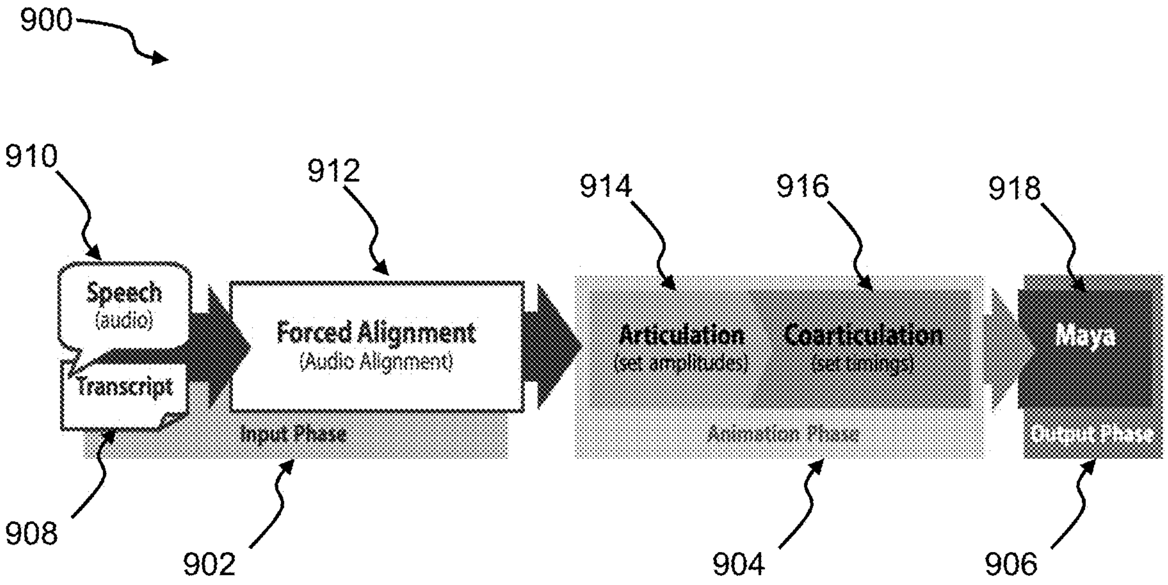
FIG. 9 is a flowchart of a method for animated lip synchronization, according to another embodiment.

In another embodiment of a method for animated lip synchronization 900 shown in FIG. 9, there is provided an input phase 902, an animation phase 904, and an output phase 906. In the input phase 902, the input module 202, produces an alignment of the input audio recording of speech 910, and in some cases its transcript 908, by parsing the speech into phonemes. Then, the alignment module 204, aligns the phonemes with the audio 910 using a forced-alignment tool 912.

In the animation phase 906, the aligned phonemes are mapped to visemes by the correspondence module 206. Viseme amplitudes are set (for articulation) 914. Then the visemes are re-processed 916, by the synchronization module 208, for co-articulation to produce viseme timings and resulting animation curves for the visemes (in an example, a Maya MEL script of sparsely keyframed visemes). These phonetic animation curves can be outputted by the output module 210 to demonstrate how the phonemes are changing over time.

Figure 4:
FIG. 4 illustrates an example of phoneme-to-viseme mapping.

In the output phase 906, the output module 210 drives the animated viseme values on a viseme compatible rig 918 such as that represented by FIG. 4. For JALI compatible rigs, JALI values can be further computed and controlled from an analysis of the recording, as described herein.

As an example, pseudocode for the method 900 can include:

```
Phonemes = list of phonemes in order of performance
Bilabials = { m b p }
Labiodental = { f v }
Sibilant = { s z J C S Z }
Obstruent = { D T d t g k f v p b }
Nasal = { m n NG }
Pause = { . , ! ? ; : aspiration }
Tongue-only = { l n t d g k NG }
Lip-heavy = { UW OW OY w S Z J C }-
LIP-SYNC (Phonemes) :
   for each Phoneme P_t in Phonemes P
      if (P_t isa lexically_stressed) power = high
   elsif (P_t isa destressed) power = low
   else power = normal
      if (P_t isa Pause) P_t = P_t-1
            if (P_t-1 isa Pause) P_t = P_t+1
      elsif (P_t isa Tongue-only)
               ARTICULATE (P_t, power, start, end, onset(P_t), offset(P_t))
               P_t = P_t+1
               if (P_t+1 isa Pause, Tongue-only) P_t = P_t-1
      if (viseme(P_t) == viseme(P_t-1))
            delete (P_t-1)
         start = prev_start
      if (P_t isa Lip-heavy)
            if (P_t-1 isnota Bilabial,Labiodental) delete (P_t-1)
         if (P_t+1 isnota Bilabial,Labiodental) delete (P_t+1)
         start = prev_start
         end = next_end
      ARTICULATE (P_t, power, start, end, onset(P_t), offset(P_t))
   if (P_t isa Sibilant) close_jaw(P_t)
   elsif (P_t isa Obstruent,Nasal)
   if (P_t-1, P_t+1 isa Obstruent,Nasal or length(P_t) >frame) close_jaw(P_t)
      if (P_t isa Bilabial) ensure_lips_close
   elsif (P_t isa Labiodental) ensure_lowerlip_close
end
```

As an example, the method 900 can be used to animate the word "what". Before animation begins, the speech audio track must first be aligned with the text in the transcript. This can happen in two stages: phoneme parsing 908 then forced alignment 912. Initially, the word 'what' is parsed into the phonemes: w 1UX t; then, the forced alignment stage returns timing information: w(2.49-2.54), 1UX(2.54-2.83), t(2.83-3.01). In this case, this is all that is needed to animate this word.

At block 904, the speech animation can be generated. First, 'w' maps to a 'Lip-Heavy' viseme and thus commences early; in some cases, start time would be replaced with the start time of the previous phoneme, if one exists. The mapping also ends late; in some cases, the end time is replaced with the end time of the next phoneme: ARTICULATE ('w', 7, 2.49, 2.83, 150 ms, 150 ms). Next, the 'Lexically-Stressed' viseme 'UX' (indicated by a '1' in front) is more strongly articulated; and thus power is set to 10 (replacing the default value of 7): ARTICULATE ('UX', 10, 2.54, 2.83, 120 ms, 120 ms). Finally, 't' maps to a Tongue-Only' viseme, and thus articulates twice: 1) ARTICULATE ('t', 7, 2.83, 3.01, 120 ms, 120 ms); and then it is replaced with the previous, which then counts as a duplicate and thus extends the previous, 2) ARTICULATE ('UX', 10, 2.54, 3.01, 120 ms, 120 ms).

For the input phase 902, accurate speech transcript is preferable in order to produce procedural lip synchronization, as extra, missing, or mispronounced words and punctuation can result in poor alignment and cause cascading errors in the animated speech. In some cases, automatic transcription tools may be used for, for example, real-time speech animation. In further cases, manual transcription from the speech recording may be used for ease and suitability. Any suitable transcript text-to-phoneme conversion, for various languages, can be used; as an example, speech libraries built into Mac™ OS X™ to convert English text into a phonemic representation.

Forced alignment 912 is then used by the alignment module 204 to align the speech audio to its phonemic transcript. Unlike the creation of speech text transcript, this task requires automation, and, in some cases, is done by training a Hidden Markov Model (HMM) on speech data annotated with the beginning, middle, and end of each phoneme, and then aligning phonemes to the speech features. Several tools can be employed for this task; for example, Hidden Markov Model Toolkit (HTK), SPHINX, and FESTIVAL tools. Using these tools, as an example, Applicant measured alignment misses to be acceptably within 15 ms of the actual timings.

In the animation phase 904, a facial rig is animated by producing sparse animation keyframes for visemes by the correspondence module 206. The viseme to be keyframed is determined by the co-articulation model described herein. The timing of the viseme is determined by forced alignment after it has been processed through the co-articulation model. The amplitude of the viseme is determined by lexical and word stresses returned by the phonemic parser. The visemes are built on Action Units (AU), and can thus drive any facial rig (for example, simulated muscle, blend-shape, or bone-based) that has a Facial Action Coding System (FACS) or MPEG-4 FA based control system.

The amplitude of the viseme can be set based on two inputs: Lexical Stress and Word Prominence. These two inputs are retrieved as part of the phonemic parsing. Lexical Stress indicates which vowel sound in a word is emphasized by convention. For example, the word 'water' stresses the 'a' not the 'e' by convention. One can certainly say 'watER' but typically people say 'WAter'. Word Prominence is the de-emphasis of a given word by convention. For example, the 'of' in 'out of work' has less word prominence than its neighbours. In an example, if a vowel is lexically stressed, the amplitude of that viseme is set to high (e.g., 9 out of 10). If a word is de-stressed, then all visemes in the word are lowered (e.g., 3 out of 10), if a de-stressed word has a stressed phoneme or it is an un-stressed phoneme in a stressed word, then the viseme is set to normal (e.g., 6 out of 10).

For co-articulation 916, timing can be based on the alignment returned by the forced alignment and the results of the co-articulation model. Given the amplitude, the phoneme-to-viseme conversion is processed through a co-articulation model, or else the lips, tongue and jaw can distinctly pronounce each phoneme, which is neither realistic nor expressive. Severe mumbling or ventriloquism makes it clear that coherent audible speech can often be produced with very little visible facial motion, making co-articulation essential for realism.

In the field of linguistics, "co-articulation" is the movement of articulators to anticipate the next sound or preserving movement from the last sound. In some cases, the representation of speech can have a few simplifying aspects. First, many phonemes map to a single viseme; for example, the phonemes: /AO/ (caught), /AX/ (about), AY/ (bite), and /AA/ (father) all map to the viseme AHH (see, for example, FIG. 4). Second, most motion of the tongue is typically hidden, as only glimpses of motion of the tongue are necessary to convince the viewer the tongue is participating in speech.

For the JALI model for audio-visual synchronized speech, the model can be based on three anatomical dimensions of visible movements: tongue, lips and jaw. Each affects speech and co-articulation in particular ways. The rules for visual speech representation can be based on linguistic categorization and divided into constraints, conventions and habits.

In certain cases, there are four particular constraints of articulation:

1. Bilabials (m b p) must close the lips (e.g., 'm' in move);
2. Labiodentals (f v) must touch bottom-lip to top-teeth or cover top-teeth completely (e.g., 'v' in move);
3. Sibilants (s z J C S Z) narrow the jaw greatly (e.g., 'C' and 's' in 'Chess' both bring the teeth close together); and
4. Non-Nasal phonemes must open the lips at some point when uttered (e.g., 'n' does not need open lips).

The above visual constraints are observable and, for all but a trained ventriloquist, likely necessary to physically produce these phonemes.

In certain cases, there are three speech conventions which influence articulation:

1. Lexically-stressed vowels usually produce strongly articulated corresponding visemes (e.g., 'a' in water);
2. De-stressed words usually get weakly-articulated visemes for the length of the word (e.g., 'and' in 'cats and dogs'.); and
3. Pauses (, . ! ? ; : aspiration) usually leave the mouth open.

Generally, it takes conscious effort to break the above speech conventions and most common visual speaking styles are influenced by them.

In certain cases, there are nine co-articulation habits that generally shape neighbouring visemes:

1. Duplicated visemes are considered one viseme (e.g., /p/ and /m/ in 'pop man' are co-articulated into one long MMM viseme);
2. Lip-heavy visemes (UW OW OY w S Z J C) start early (anticipation) and end late (hysteresis);
3. Lip-heavy visemes replace the lip shape of neighbours that are not labiodentals and bilabials;
4. Lip-heavy visemes are simultaneously articulated with the lip shape of neighbours that are labiodentals and bilabials;
5. Tongue-only visemes (l n t d g k N) have no influence on the lips: the lips always take the shape of the visemes that surround them;
6. Obstruents and Nasals (D T d t g k f v p b m n N) with no similar neighbours, that are less than one frame in length, have no effect on jaw (excluding Sibilants);
7. Obstruents and Nasals of length greater than one frame, narrow the jaw as per their viseme rig definition;
8. Targets for co-articulation look into the word for their shape, anticipating, except that the last phoneme in a word tends to looks back (e.g., both /d/ and /k/ in 'duke' take their lip-shape from the 'u'.); and
9. Articulate the viseme (its tongue, jaw and lips) without co-articulation effects, if none of the above rules affect it.

A technical problem for speech motion in computerized animation is to be able to optimize both simplicity (for benefit of the editing animator) and plausibility (for the benefit of the unedited performance).

In general, speech onset begins 120 ms before the apex of the viseme, wherein the apex typically coincides with the beginning of a sound. The apex is sustained in an arc to the point where 75% of the phoneme is complete, viseme decay then begins and then it takes another 120 ms to decay to zero. In further cases, viseme decay can advantageously begin between 70% and 80% of the completion of the respective phoneme. However, there is evidence that there is a variance in onset times for different classes of phonemes and phoneme combinations; for example, empirical measurements of specific phonemes /m p b f/ in two different states: after a pause (mean range: 137-240 ms) and after a vowel (mean range: 127-188 ms). The JALI model of the system and method described herein can advantageously use context-specific, phoneme-specific mean-time offsets. Phoneme onsets are parameterized in the JALI model, so new empirical measurements of phonemes onsets can be quickly assimilated.

Figure 13:
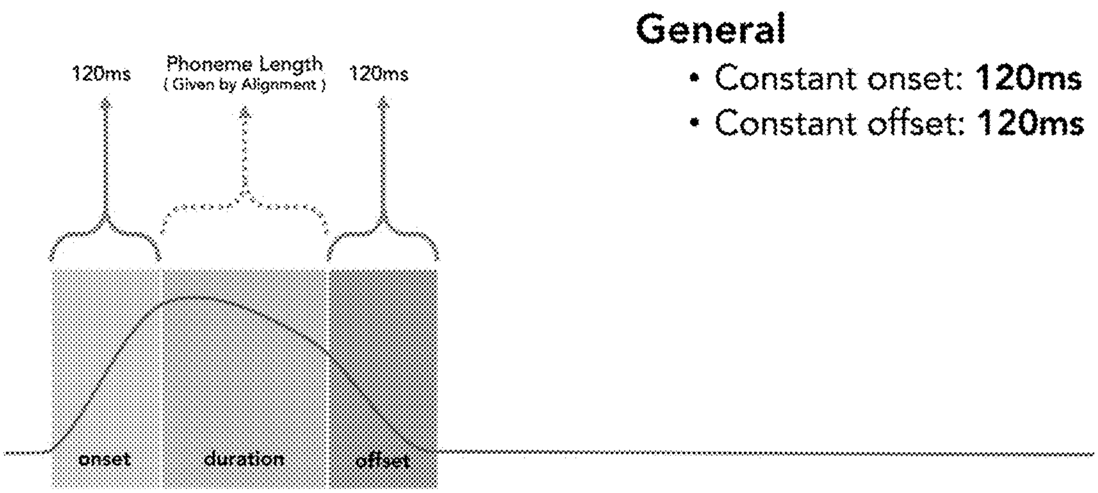
FIG. 13 illustrates a graph for phoneme construction according to an example.
Figure 14:
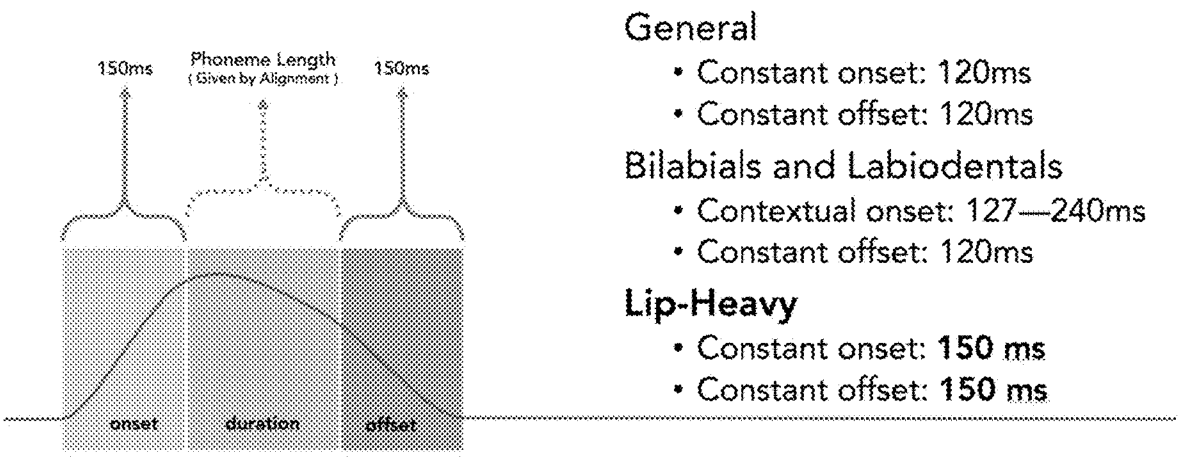
FIG. 14 illustrates a graph for phoneme construction according to another example.
Figure 15:
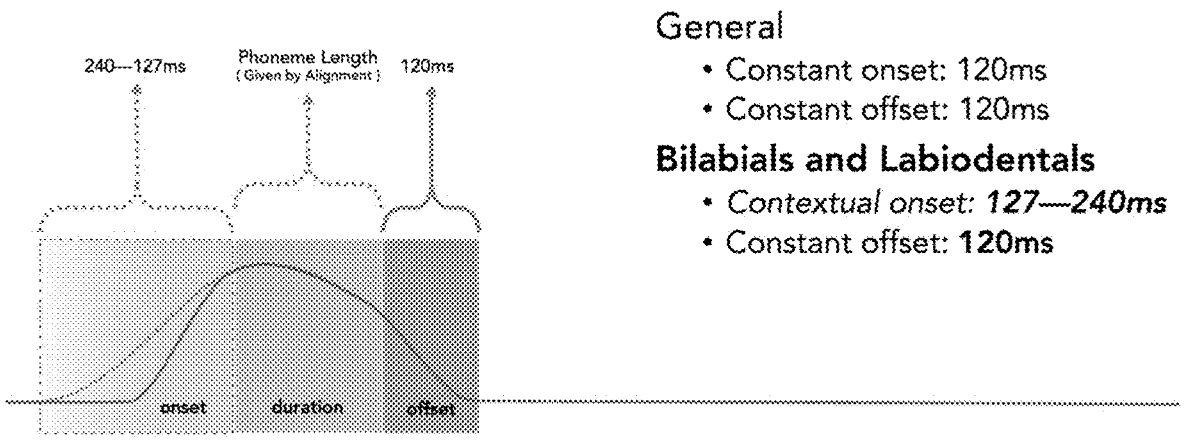
FIG. 15 illustrates a graph for phoneme construction according to yet another example.

In some cases, where phoneme durations are very short, then visemes will have a wide influence beyond its direct neighbours. In some cases, visemes can influence mouth shape up to five phonemes away, specifically lip-protrusion. In an embodiment herein, each mouth shape can be actually influenced by both direct neighbours, since the start of one is the end of another and both are keyed at the point. In further embodiments, as shown in FIG. 13, the second-order neighbours can also be involved since each viseme starts at least 120 ms before it is heard and ends 120 ms after. In the case of lip-protrusion, as shown in FIG. 14, it can be extended to 150 ms onset and offset. As shown in FIG. 15, another construction for bilabials and labiodentals can have a context specific onset. In this case, the onset can be dependent on the viseme being in the middle of a word/phrase or following a pause/period/punctuation.

Figure 16:
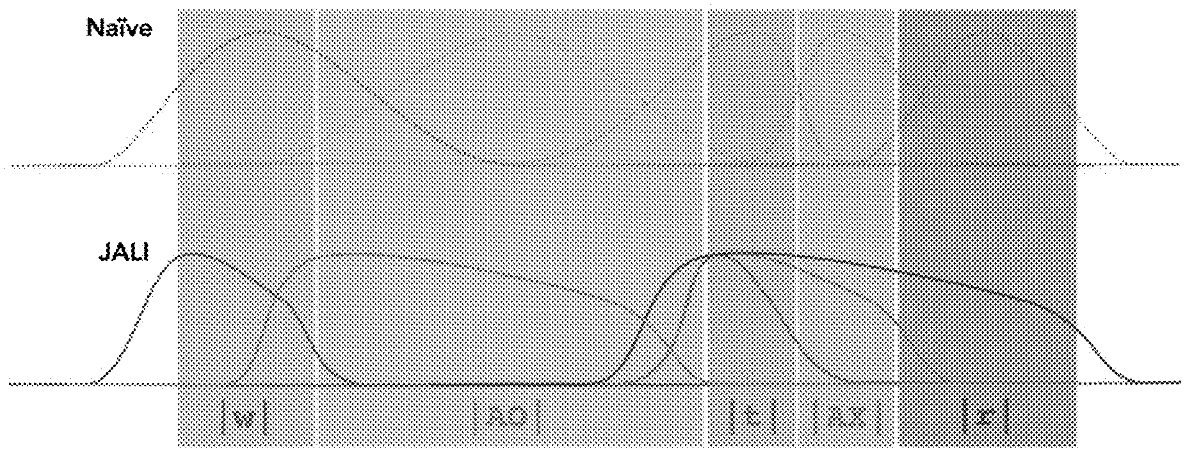
FIG. 16 illustrates a comparison graph for an exemplary phoneme between a conventional model and a JALI model.

FIG. 16 illustrates a graph comparing animation of the word "water" using conventional "naïve" animation models and the JALI model described herein. As shown, as opposed to the conventional model, in the JALI model the end of the viseme duration (the point where the offset starts) can begin when the phoneme is 75% complete. In this way, the offset can be started before the end of the phoneme duration (shown as the vertical bands). In further cases, the offset can be between 70% and 80% of the completion of the phoneme. Additionally, in some cases, the end point keyframe can be completely dropped off if the phoneme is shorter than a selected time; for example, 70 ms (which is the case for "|t|" in the example shown in FIG. 16).

The Arc is a principle of animation and, in some cases, the system and method described herein can fatten and retain the facial muscle action in one smooth motion arc over duplicated visemes. In some cases, all the phoneme articulations have an exaggerated quality in line with another principle of animation, Exaggeration. This is due to the clean curves, the sharp rise and fall of each phoneme, each simplified and each slightly more distinct from its neighbouring visemes than in real-world speech.

For computing JALI values, according to the system and method described herein, from audio, in the animation phase 904, the JA and LI parameters of the JALI-based character can be animated by examining the pitch and intensity of each phoneme and comparing it to all other phonemes of the same class uttered in a given performance.

In some cases, three classes of phonemes can be examined: vowels, plosives and fricatives. Each of these classes requires a slightly different method of analysis to animate the lip parameter. Fricatives (s z f v S Z D T) create friction by pushing air past the teeth with either the lips or the tongue. This creates intensity at high frequencies, and thus they have markedly increased mean frequencies in their spectral footprints compared to those of conversational speech. If greater intensity is detected at a high frequency for a given fricative, then it is known that it was spoken forcefully and heavily-articulated. Likewise, with Plosives (p b d t g k), the air stoppage by lip or tongue builds pressure and the sudden release creates similarly high frequency intensity; whereby the greater the intensity, the greater the articulation.

Unlike fricatives and plosives, vowels are generally always voiced. This fact allows the system to measure the pitch and volume of the glottis with some precision. Simultaneous increases in pitch and volume are associated with emphasis. High mean formant $F_0$ and high mean intensity are correlated with high arousal (for example, panic, rage, excitement, joy, or the like) which are associated with bearing teeth and greater articulation, and exaggerated speech. Likewise, simultaneous decreases are associated with low arousal (for example, shame, sadness, boredom, or the like).

In a particular embodiment, vowels are only considered by the JALI model if they are lexically stressed and fricatives/plosives are only considered if they arise before/after a lexically stressed vowel. This criteria advantageously chooses candidates carefully and keeps animation from being too erratic. Specifically, lexically stressed sounds will be the most effected by the intention to articulate, yell, speak strongly or emphasize a word in speech. Likewise the failure to do so will be most indicative of a mutter, mumble or an intention not to be clearly heard, due for example to fear, shame, or timidity.

Applicant recognized further advantages to the method and system described herein. The friction of air through lips and teeth make high frequency sounds which impair comparison between fricative/plosives and vowel sounds on both the pitch and intensity dimension; such that they must be separated from vowels for coherent/accurate statistical analysis. These three phoneme types can be compared separately because of the unique characteristics of the sound produced (these phoneme-types are categorically different). This comparison is done in a way that optimally identifies changes specific to each given phoneme type. In further cases, the articulation of other phoneme-types can be detected.

In some embodiments, pitch and intensity of the audio can analyzed with a phonetic speech analyzer module 212 (for example, using PRAAT™). Voice pitch is measured spectrally in hertz and retrieved from the fundamental frequency. The fundamental frequency of the voice is the rate of vibration of the glottis and abbreviated as $F_0$. Voice intensity is measured in decibels and retrieved from the power of the signal. The significance of these two signals is that they are perceptual correlates. Intensity is power normalized to the threshold of human hearing and pitch is linear between 100-1000 Hz, corresponding to the common range of the human voice, and non-linear (logarithmic) above 1000 Hz. In a certain case, high-frequency intensity is calculated by measuring the intensity of the signal in the 8-20 kHz range.

In a further embodiment, for vocal performances of a face that is shouting throughout, automatic modulation of the JA (jaw) parameter may not be needed. The jaw value can simply be set to a high value for the entire performance. However, when a performer fluctuates between shouting and mumbling, the automatic full JALI model, as described herein, can be used. The method, as described herein, gathers statistics, mean/max/min and standard deviation for each, intensity and pitch and high frequency intensity.

Table 1 shows an example of how jaw values are set for vowels (the 'vowel intensity' is of the current vowel, and 'mean' is the global mean intensity of all vowels in the audio clip):

TABLE 1

| Intensity of vowel vs. Global mean intensity | Rig Setting |
|---|---|
| vowel_intensity ≤ mean − stdev | Jaw(0.1-0.2) |
| vowel_intensity ≈ mean | Jaw(0.3-0.6) |
| vowel_intensity ≥ mean + stdev | Jaw(0.7-0.9) |

Table 2 shows an example of how lip values are set for vowels (the 'intensity/pitch' is of the current vowel, and 'mean' is the respective global mean intensity/pitch of all vowels in the audio clip):

TABLE 2

| Intensity/pitch of vowel vs. Global means | Rig Setting |
|---|---|
| intensity/pitch ≤ mean − stdev | Lip(0.1-0.2) |
| intensity/pitch ≈ mean | Lip(0.3-0.6) |
| intensity/pitch ≥ mean + stdev | Lip(0.7-0.9) |

Table 3 shows an example of how lip values are set for fricatives and plosives (the 'intensity' is the high frequency intensity of the current fricative or plosive, and 'mean' is the respective global mean high frequency intensity of all fricatives/plosives in the audio clip):

TABLE 3

| HF Intensity fricative/plosive vs. Global means | Rig Setting |
|---|---|
| intensity ≤ mean − stdev | Lip(0.1-0.2) |
| intensity ≈ mean | Lip(0.3-0.6) |
| intensity ≥ mean + stdev | Lip(0.7-0.9) |

In a further embodiment, given two input files representing speech audio and text transcript, phonemic breakdown and forced alignment can be undertaken according to the method described herein. In an example, scripts (for example, applescript and praatscript) can be used to produce a phonemic breakdown and forced alignment while using an appropriate utility. This phonemic alignment is then used, by the speech analyzer 212 (for example, using PRAAT™), to produce pitch and intensity mean/min/max for each phoneme. Then, the phonemes can be run through to create animated viseme curves by setting articulation and co-articulation keyframes of visemes, as well as animated JALI parameters, as an appropriate script (for example, Maya Embedded Language (MEL) script). In some cases, this script is able to drive the animation of any JALI rigged character, for example in MAYA™.

Figure 10:
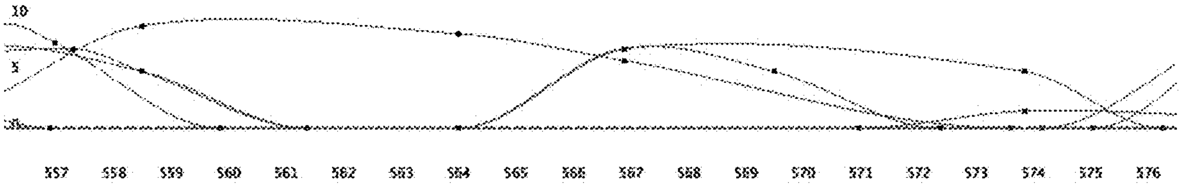
FIG. 10 is an exemplary graph illustrating the word ‘water’ as output by the system of FIG. 2.
Figure 11:
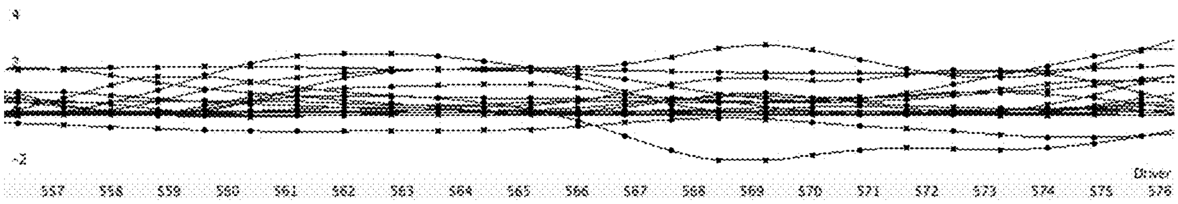
FIG. 11 is an exemplary graph illustrating the word ‘water’ as output by a conventional performance capture system.
Figure 12:
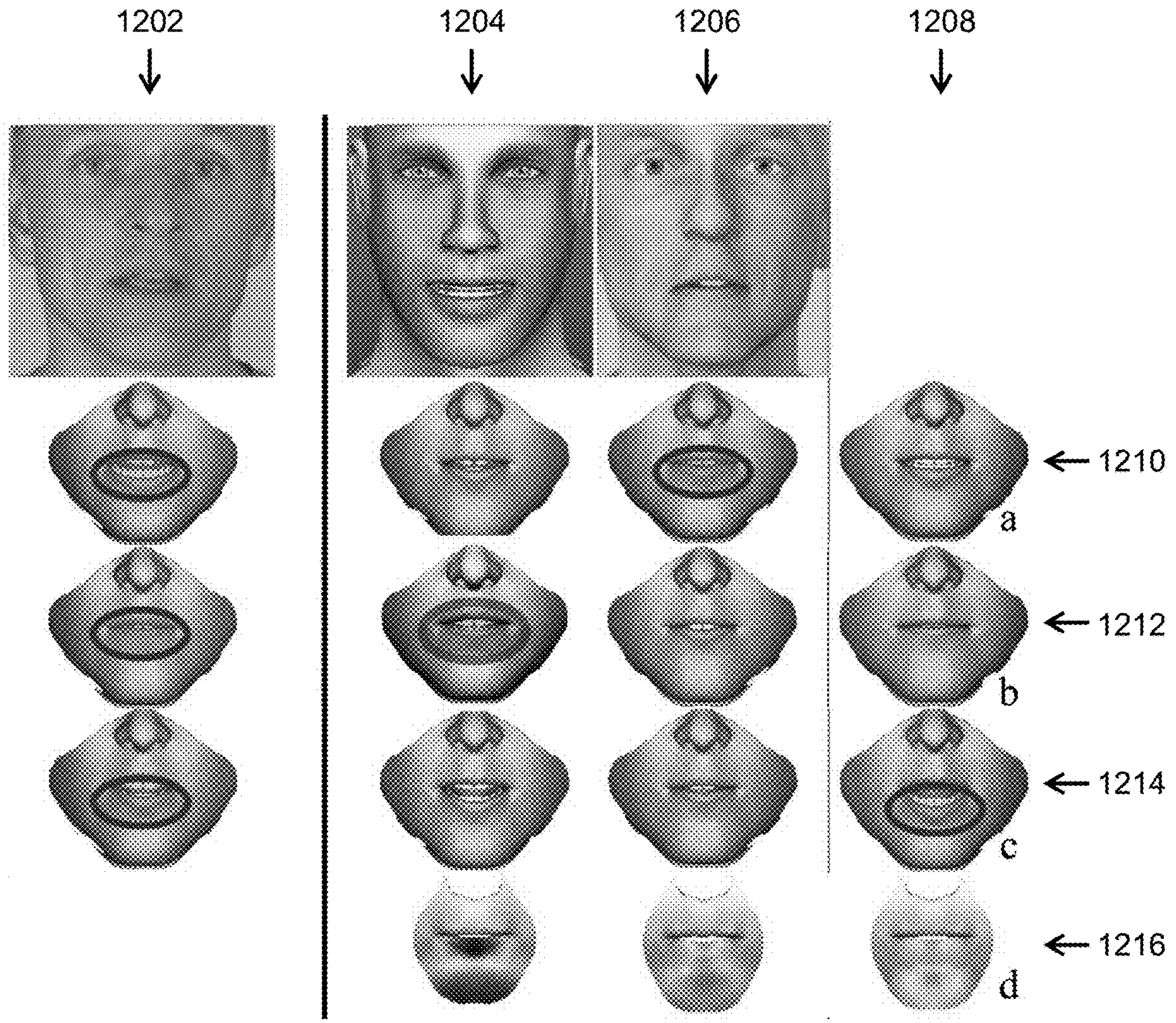
FIG. 12 illustrates an exemplary comparison of error outputs from various lip synchronization approaches.

As described below, the method and system as described herein can include the advantageous feature of the production of low-dimensionality signals. In an embodiment, the dimensionality of the output phase 906 is matched to a human communication signal. In this way, people can perceive phonemes and visemes, not arbitrary positions of a part of the face. For example, the procedural result of saying the word "water", as shown in FIG. 10 using the present embodiments, is more comprehensible and more amenable to animator editing than a conventional motion capture result, as shown in FIG. 11. FIG. 10 illustrates twenty points calculated for the word 'water' as output by the present system. When compared with the conventional motion-capture approach of FIG. 11, which requires 648 points recorded for the performance capture of the word 'water'. At 30 fps, performance capture requires 32.4 times as many points as the method described herein to represent the same word. Advantageously, the long regular construction and arc shape in each animation curve allows easier comprehension and editing of the curves with this shape.

In an example, a manner for evaluating the success of a realistic procedural animation model can be by comparing that animation to 'ground truth'; i.e., a live-action source. Using live-action footage, the Applicant has evaluated the JALI model, as described in the system and method herein, by comparing it not only to live-footage, but also to the speech animation output from a dynamic visemes method, and a Dominance model method.

In this evaluation, a facial motion capture tool was utilized to track the face of the live-action face from the live-action footage, as well as the animated faces output from the aforementioned methods. Tracking data is then applied to animate ValleyBoy 704, allowing evaluation of the aforementioned models on a single facial rig. By comparing the JALI model, dynamic visemes and the dominance model to the 'ground truth' of the motion-captured live-action footage, a determination can be made regarding the relative success of each method. The exemplary evaluation used 'heatmaps' of the displacement errors of each method with respect to the live-action footage.

In FIG. 9, an example of successes and failures of all three aforementioned methods is shown; for the live action control 1202, dominance model 1204, dynamic visemes 1206, and the JALI model 1208. For a first exemplary viseme 1210, we see a timing error with the dynamic viseme model, in that the lips fail to anticipate the leading phoneme just prior to the first spoken sentence. In a second exemplary viseme 1212, the dominance method shows a lack of lip closing in the /F/ phoneme "to Fit"; the result of excessive co-articulation with adjacent vowel phonemes. In a third exemplary viseme 1214, the JALI method shows error in the lower lip, as it over-enunciates /AA/ ("dArkness").

In the map of 1216, accumulated error for the 7-second duration of the actor's speech is shown. The dynamic viseme and JALI models fare significantly better than the dominance model in animating this vocal track. In general, dominance incurs excessive co-articulation of lip-heavy phonemes such as /F/ with adjacent phonemes. The dynamic viseme model appears to under-articulate certain jaw-heavy vowels such as /AA/, and to blur each phoneme over its duration. To a conspicuously lesser extent, the JALI model appears to over-articulate these same vowels at times.

Applicant recognized the substantial advantages of the methods and systems described herein for the automatic creation of lip-synchronized animation. The present approach can produce technological results that are comparable or better than conventional approaches in both performance-capture and data-driven speech, encapsulating a range of expressive speaking styles that is easy-to-edit and refine by animators.

In an example of the application of the advantages of the JALI model, as described herein, the Applicant recruited professional and student animators to complete three editing tasks: 1) adding a missing viseme, 2) fixing non-trivial out-of-sync phrase and 3) exaggerating a speech performance. Each of these tasks were completed with motion capture generated data and with JALI model generated data. All participants reported disliking editing motion capture data and unanimously rated it lowest for ease-of-use, ability to reach expectations and quality of the final edited result for all tasks, especially when compared to the JALI model. Overall, editing with the JALI model was preferred 77% of the time.

As evidenced above, Applicants recognized the advantages of having a model that includes both the benefits of being procedurally generated but still allowing ease of use for animators; such ease of use allows animators to get to an end product faster than conventional methods.

In a further advantage of the method and system described herein, the JALI model does not require marker-based performance capture. This is advantageous because output can be tweaked rather than recaptured. In some cases, for example with the capture of bilabials, the system noticeably outperforms performance capture approaches. Bilabials in particular are very important to get correct, or near correct, because the audience can easily and conspicuously perceive when animation of them is off. Furthermore, the approaches described herein do not require the capturing of voice actors such as in performance capture approaches. Thus, the approaches described herein do not have to rely on such actors who may not always be very expressive when it comes to using facial features, and thus risk the animation not being particularly expressive as a result.

The JALI model advantageously allows for the automatic creation of believable speech-synchronized animation sequences using only text and audio as input. Unlike many data-driven or performance capture methods, the output from the JALI model is animator-centric, and amenable to further editing for more idiosyncratic animation.

Applicant further recognized the advantages of allowing the easy combination of both the JALI model and its output with other animation workflows. As an example, the JALI model lip and jaw animation curves can be easily combined with head motion obtained from performance-capture.

The system and method, described herein, has a wide range of potential applications and uses; for example, in conjunction with body motion capture. Often the face and body are captured separately. One could capture the body and record the voice, then use the JALI model to automatically produce face animation that is quickly synchronized to the body animation via the voice recording. This is particularly useful in a virtual reality or augmented reality setting where facial motion capture is complicated by the presence of head mounted display devices.

In another example of a potential application, the system and method, as described herein, could be used for video games. Specifically, in role playing games, where animating many lines of dialogue is prohibitively time-consuming.

In yet another example of a potential application, the system and method, as described herein, could be used for crowds and secondary characters in film, as audiences' attention is not focused on these characters nor is the voice track forward in the mix.

In yet another example of a potential application, the system and method, as described herein, could be used for animatics or pre-viz, to settle questions of layout.

In yet another example of a potential application, the system and method, as described herein, could be used for animating main characters since the animation produced is designed to be edited by a skilled animator.

In yet another example of a potential application, the system and method, described herein, could be used for facial animation by novice or inexperienced animators.

Other applications may become apparent.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method for animated lip synchronization executed on a processing unit, the method comprising:

mapping each one of a plurality of phonemes to a plurality of visemes, each of the plurality of visemes having a first viseme shape capturing jaw behavior and a second viseme shape capturing lip behavior;

for each of the phonemes, synchronizing the visemes into two or more viseme action units, each of the two or more viseme action units comprising jaw contributions from the first viseme shape and lip contributions from the second viseme shape, the two or more viseme action units are co-articulated such that the respective two or more viseme action units are approximately concurrent and the jaw contributions and the lip contributions are respectively synchronized to independent visemes that occur concurrently over the duration of the phoneme, wherein the two or more viseme action units are co-articulated with at least one of the following, otherwise there is no coarticulation:

duplicated visemes are considered one viseme, lip-heavy visemes start early and end late, replace the lip contributions of neighbours that are not labiodentals and bilabials, and are articulated with the lip contributions of neighbours that are labiodentals and bilabials, tongue-only visemes have no influence on the lip contribution, and obstruents and nasals, with no similar neighbours and are less than one frame in length, have no influence on jaw contribution, and with a length greater than one frame, narrow the jaw contribution; and outputting the one or more viseme action units.

2. The method of claim 1, further comprising capturing speech input; parsing the speech input into the phonemes; and aligning the phonemes to the corresponding portions of the speech input.

3. The method of claim 2, wherein aligning the phonemes comprises one or more of phoneme parsing and forced alignment.

4. The method of claim 1, wherein the viseme action units are a linear combination of the independent visemes.

5. The method of claim 1, wherein the jaw contributions and the lip contributions are each respectively synchronized to activations of one or more facial muscles in a biomechanical muscle model such that the viseme action units represent a dynamic simulation of the biomechanical muscle model.

6. The method of claim 1, wherein mapping the phonemes to the visemes comprises at least one of mapping a start time of at least one of the visemes to be prior to an end time of a previous respective viseme and mapping an end time of at least one of the visemes to be after a start time of a subsequent respective viseme.

7. The method of claim 1, wherein a start time of at least one of the visemes is at least 120 ms before the respective phoneme is heard, and an end time of at least one of the visemes is at least 120 ms after the respective phoneme is heard.

8. The method of claim 1, wherein a start time of at least one of the visemes is at least 150 ms before the respective phoneme is heard, and an end time of at least one of the visemes is at least 150 ms after the respective phoneme is heard.

9. The method of claim 1, wherein viseme decay of at least one of the visemes begins between seventy-percent and eighty-percent of the completion of the respective phoneme.

10. The method of claim 1, wherein an amplitude of each viseme is determined at least in part by one or more of lexical stress and word prominence.

11. The method of claim 1, wherein the viseme action units further comprise tongue contributions for each of the phonemes.

12. The method of claim 1, wherein the viseme action unit for a neutral pose comprises a viseme mapped to a bilabial phoneme.

13. The method of claim 1, further comprising outputting a phonetic animation curve based on the change of viseme action units over time.

14. A system for animated lip synchronization, the system having one or more processors and a data storage device, the one or more processors in communication with the data storage device, the one or more processors configured to execute:

a correspondence module for mapping each one of a plurality of phonemes to a plurality of visemes, each of the plurality of visemes having a first viseme shape capturing jaw behavior and a second viseme shape capturing lip behavior;

a synchronization module for synchronizing, for each of the phonemes, the visemes into two or more viseme action units, each of the one or more viseme action units comprising jaw contributions from the first viseme shape and lip contributions from the second viseme shape, the two or more viseme action units are co-articulated such that the respective two or more viseme action units are approximately concurrent and the jaw contributions and the lip contributions are respectively synchronized to independent visemes that occur concurrently over the duration of the phoneme, wherein the two or more viseme action units are co-articulated with at least one of the following, otherwise there is no coarticulation:

duplicated visemes are considered one viseme, lip-heavy visemes start early and end late, replace the lip contributions of neighbours that are not labiodentals and bilabials, and are articulated with the lip contributions of neighbours that are labiodentals and bilabials, tongue-only visemes have no influence on the lip contribution, and obstruents and nasals, with no similar neighbours and are less than one frame in length, have no influence on jaw contribution, and with a length greater than one frame, narrow the jaw contribution; and an output module for outputting the one or more viseme action units to an output device.

15. The system of claim 14 further comprising an input module for capturing speech input received from an input device, the input module parsing the speech input into the phonemes; and an alignment module for aligning the phonemes to the corresponding portions of the speech input.

16. The system of claim 15, wherein the alignment module aligns the phonemes by at least one of phoneme parsing and forced alignment.

17. The system of claim 14 further comprising a speech analyzer module for analyzing one or more of pitch and intensity of the speech input.

18. The system of claim 14, wherein the output module further outputs a phonetic animation curve based on the change of viseme action units over time.

* * * * *